United States Patent [19]

Kurihara et al.

[11] Patent Number: 4,878,791
[45] Date of Patent: Nov. 7, 1989

[54] EXPANDING PLASTIC FASTENER

[75] Inventors: Kazumasa Kurihara, Utsunomiya; Seiji Takahashi, Hiroshima; Yoshio Kaneko, Utsunomiya, all of Japan

[73] Assignee: Nifco Inc., Yokohama, Japan

[21] Appl. No.: 259,909

[22] Filed: Oct. 19, 1988

[30] Foreign Application Priority Data

Oct. 19, 1987 [JP] Japan ............................ 62-261642
Oct. 20, 1987 [JP] Japan ............................ 62-262580

[51] Int. Cl.⁴ ...................... F16B 13/04; F16B 13/06
[52] U.S. Cl. ........................................ 411/55; 411/41; 411/59
[58] Field of Search .............. 411/41, 44, 55, 57, 411/59, 60; 24/297

[56] References Cited

U.S. PATENT DOCUMENTS

| 4,311,421 | 1/1982 | Okada et al. |  |
|---|---|---|---|
| 4,367,995 | 1/1983 | Mizusawa et al. |  |
| 4,391,559 | 7/1983 | Mizusawa | 411/41 |
| 4,478,545 | 10/1984 | Mizusawa et al. |  |
| 4,610,587 | 9/1986 | Wollar et al. | 411/59 |

FOREIGN PATENT DOCUMENTS

| 2905298 | 8/1979 | Fed. Rep. of Germany | 411/41 |
|---|---|---|---|
| 2069089 | 8/1981 | United Kingdom | 411/59 |

*Primary Examiner*—Neill R. Wilson
*Attorney, Agent, or Firm*—Oblon, Spivak, McClelland, Maier & Neustadt

[57] ABSTRACT

A coupler for coupling together plates includes a male member having a head and a pin-like portion having male threads and depending from the lower surface of the head and a female member having a flange facing the head of the male member, a leg portion depending from the lower end of the flange and a bore extending from the upper surface of the flange into the leg portion and capable of receiving the pin-like portion of the male member. An upper portion of the inner periphery of the bore is provided with a helical ridge.

4 Claims, 7 Drawing Sheets

EXPANDING PLASTIC FASTENER

BACKGROUND OF THE INVENTION

1. Field of the Invention

This invention relates to a coupler for coupling together plates comprising a male member with male threads and a female member for receiving the male member

2. Prior Art Statement

U S. Pat. No. 4,311,421 discloses a coupler which comprises a male member having a head and a pin-like portion having male threads and depending from the lower surface of the head and a female member having a flange facing the head of the male member, a leg portion depending from the lower end of the flange and a bore extending from the upper surface of the flange into the leg portion and capable of receiving the pin-like portion of the male member. The male and female members are prepared as respective plastic one-piece moldings.

The leg portion of the female member has a pair of axial grooves radially spaced apart around the bore and a pair of spreadable portions formed between the axial grooves and each having an upper end united to the lower end of the flange and a lower end coupled to that of the other via a hinge portion and capable of being spread with the insertion of the pin-like portion into the bore. The inner surface of each of the two spreadable portions is integrally formed with upper and lower semi-spherical projections to be fitted in thread grooves defined between adjacent threads of the male member.

The above prior art coupler, however, has problems in the operation of detaching the male member from the female member by turning the male member in the direction opposite to the direction of the threads.

More specifically, when coupling and fastening together the two plates, the spreadable portions of the female member are spread by forcibly inserting the pin-like portion of the male member into the bore of the female member. To release the coupled state of the two plates, the male member may be turned in the direction opposite to the direction of the threads. As the male member is turned in this direction, the semi-spherical projections in the bore of the female member are moved along the thread grooves in the pin-like portion of the male member. Thus, the pin-like portion of the male member is retreated along the bore of the female member and is detached from the female member.

However, since the semi-spherical projections formed on the surface of the bore of the female member are small, they mesh to a small extent with the thread grooves of the pin-like portion of the male member. For this reason, when the male member is turned for removing it from the female member, the projections will readily clear the threads with application of a force to the male member in a direction of pushing the male member into the bore of the female member.

This leads to idling of the pin-like portion of the male member in the bore of the female member, so that the male member is not readily removed. The idling is liable to occur particularly when the male member is turned quickly by using a motor-driven tool. Therefore, the prior art coupler is not suitable for the male member removal operation using a motor-driven tool.

When the extent of projection of the semi-spherical projections on the surface of the bore of the female member is increased, the extent of mesh of the projections in the thread grooves of the pin-like portion of the male member is increased to eliminate such idling. However, if the extent of projection of the spherical projections is increased, it becomes correspondingly difficult to remove the female member from a mold at the time of molding the female member.

Figures 22, 23, 24:
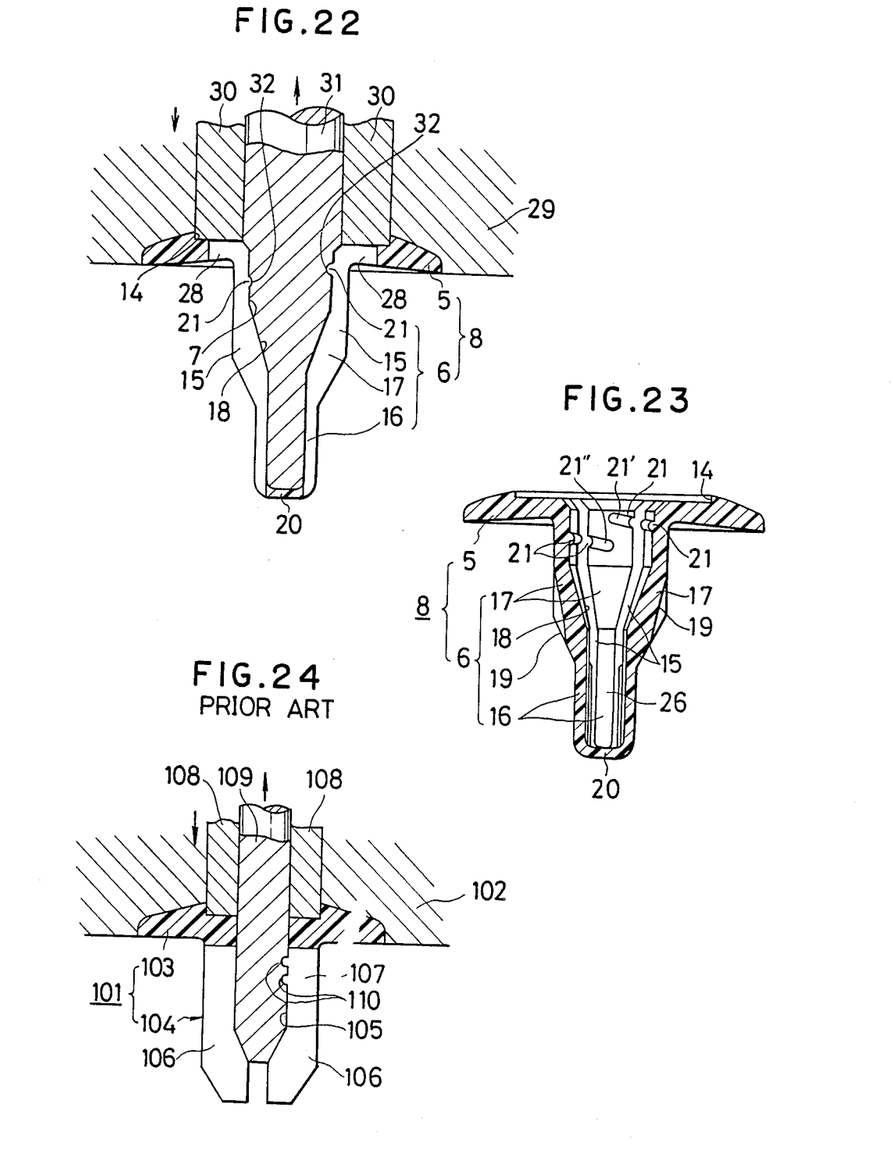
FIG. 22 is a sectional view showing a mold for molding the female member shown in FIG. 9.
FIG. 23 is a sectional view showing a modification of the female member shown in FIG. 9.
FIG. 24 is a sectional view showing a well-known mold for molding a female member.

More specifically, FIG. 24 shows a stationary mold 102 for molding the female member 101. The mold 102 comprises a kicker pin 108 for taking out the female member 101 as a product and a core pin 109 for forming the bore 105 of the female member 101. The outer periphery of the core pin 109 is formed with recesses 110 for forming the semi-spherical projections 107 of the female member 101.

When molding the female member 101, the stationary mold 102 and a movable mold (not shown) are butt-closed together, and a molten plastic material is poured into the mold assembly. After the poured material has solidified, the mold assembly is opened by moving the movable mold, and then the female member 101 thus produced is kicked out by the kicker pin 108, while at the same time the core pin 109 is withdrawn from the bore 105 of the female member 101, thus separating the female member from the stationary mold 102. However, when the extent of projection of the semi-spherical projections 107 is increased, it becomes correspondingly difficult to remove the core pin 109, and sometimes the projections that are formed are deformed or broken so that they can no longer fulfill their role. For this reason, the semi-spherical projections have inevitably been small in size. In FIG. 24, reference numerals 103, 104 and 106 respectively designate a flange, a leg portion and axial grooves of the female member 101.

OBJECT AND SUMMARY OF THE INVENTION

The present invention aims at solving the above problems, and it has an object of providing a coupler for coupling together a plurality of plates which has improved male member removal performance so that the male member can be turned without any possibility of idling in the direction opposite to the direction of the threads when it is removed it from the female member.

To attain the above object of the invention, there is provided a coupler for coupling together plates, comprising a male member having a head and a pin-like portion having male threads and depending from the lower surface of said head, and a female member having a flange facing the head of the male member, a leg portion depending from the lower end of the flange and a bore extending from the upper surface of the flange into the leg portion and capable of receiving the pin-like portion of the male member, the leg portion of the female member having a plurality of axial grooves radially spaced apart around the bore and a plurality of spreadable portions each defined between adjacent ones of the axial grooves and having an upper end united to the lower ends of the others by hinge portions, the spreadable portions being adapted to be spread with the insertion of the pin-like portion into the bore, an upper portion of the inner periphery of the bore being formed with a helical ridge to be received in a thread groove defined between the male threads of the pin-like portions.

To couple together two plates with the coupler having the above construction, the two plates are overlapped with their mounting holes aligned together, and the leg portion of the female member is inserted through the aligned holes.

Then, the pin-like portion of the male member is inserted into the bore of the female member.

It is possible to assemble together the male and female members before inserting the female member through the two holes.

Subsequently, the male member is strongly pushed into the female member. As a result, the threads of the male member are advanced into the bore by clearing the ridge. The spreadable portions of the female member are thus spread under the lower plate. The two plates are thus clamped between the lower surface of the flange and the spreadable portions, so that the two plates are coupled and fastened together in the overlapped state.

Then, if it becomes necessary to separate the two plates for maintenance or the like, the head of the male member may be turned in the direction opposite to the direction of the threads.

By turning the male member in this direction, the ridge fitted in a thread groove is reliably moved along the thread groove, and the pin-like portion is retreated along the bore to be eventually removed. In consequence, the spreadable portions are contracted under the plates to restore to their initial diameter.

The leg portion of the female member thus is contracted to a diameter sufficient to be removed from the two holes. Thus, the two plates are released from the overlappedly coupled state and can be separated from each other.

The female member thus can be recovered by withdrawing it from the two holes. The male and female members which are recovered in this way can be re-used.

The above and other objects and features of the invention will become more apparent from the following detailed description with reference to the accompanying drawings.

DETAILED DESCRIPTION OF THE PREFERRED EMBODIMENTS

FIGS. 1 to 8 show a first embodiment of the coupler according to the invention.

Figure 1:
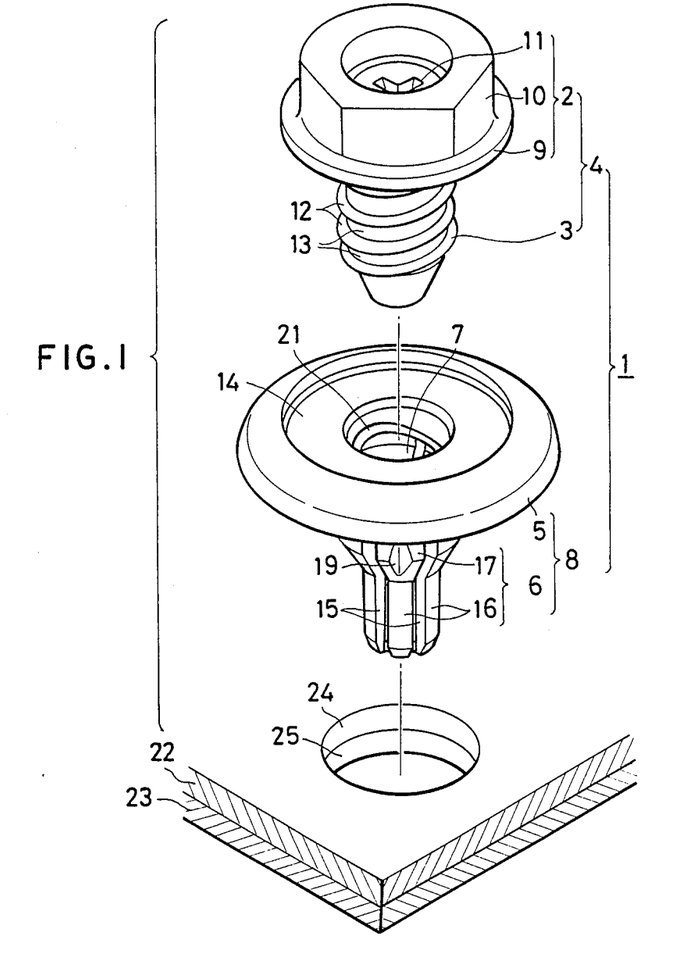
FIG. 1 is an exploded perspective view showing male and female members, separated from each other, of a first embodiment of the coupler according to the invention.
Figure 2:
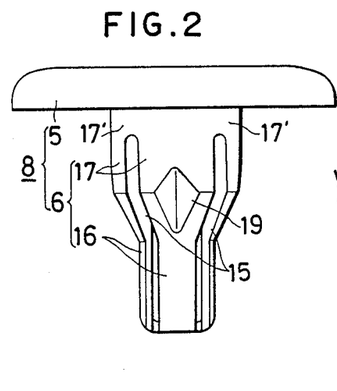
FIG. 2 is a side view showing the female member shown in FIG. 1.
Figure 3:
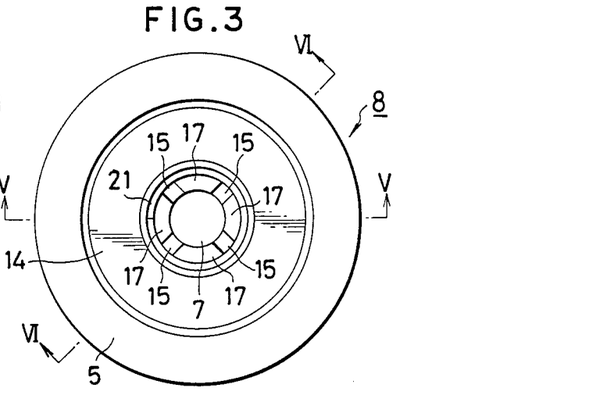
FIG. 3 is a plan view showing the female member shown in FIG. 1.
Figure 4:
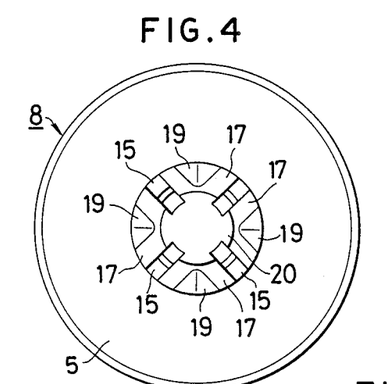
FIG. 4 is a bottom view showing the female member shown in FIG. 1.
Figure 5:
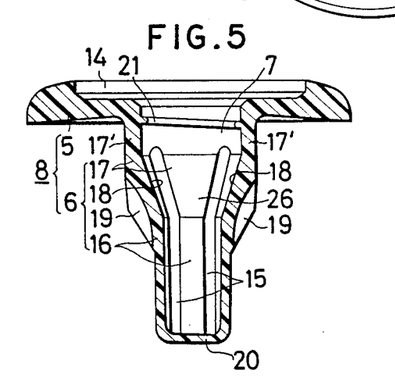
FIG. 5 is a sectional view taken along line V-V in FIG. 3.
Figure 6:
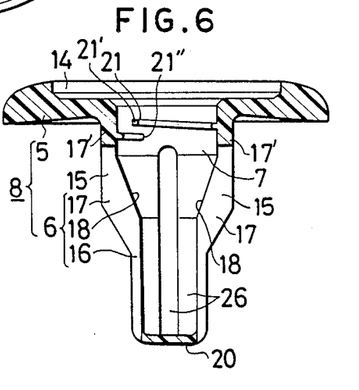
FIG. 6 is a sectional view taken along line VI-VI in FIG. 3.

In the Figure, reference numeral 1 designates the coupler. The coupler 1 comprises a male member 4 having a head 2 and a pin-like portion 3 depending from the lower surface of the head 2, and a female member 8 having a flange 5 facing the head 2 of the male member 4, a leg portion 6 depending from the lower surface of the flange 5 and a bore 7 extending from the top of the flange 5 into the leg portion 6 and capable of receiving the pin-like portion 3 of the male member 4. The male and female members 4 and 8 are respective plastic moldings.

As shown in FIG. 1, the head 2 of the male member 4 has a thin disk-like seat portion 9, a hexagonal bolt portion 10 extending from the top of the seat portion 9 and adapted to be fitted in a spanner or a wrench (not shown) and a cross groove 11 formed in the bottom of a central recess formed in the top surface of the bolt portion 10. The groove 11 is adapted to receive the tip of a phillips screwdriver (not shown). The groove 11 may have a shape adapted to receive the tip of a slot-type screwdriver. The head 2 may be provided with the bolt portion 10 alone or the groove 11 alone.

Also as shown in FIG. 1, the pin-like portion 3 depends from the center of the lower surface of the seat portion 9 and has a tapering end. Its periphery is formed with threads 12 having a semi-circular sectional profile and thread grooves 13 each defined between adjacent threads 12. The shape and material of the male member 4 are not limited to those in the illustrated embodiment, but it is possible to use a metallic bolt or screw directly, with the diameter and length thereof taken into consideration.

As shown in FIGS. 1 to 6, in the female member 8 the flange 5 is annular in shape and has an outer diameter greater than that of the seat portion 9 of the male member 4. Its top surface is formed with a shallow annular recess 14 which is concentric with the bore 7 and in which the seat portion 9 of the male member 4 can fit snugly.

The leg portion 6 depending from the lower surface of the flange 5 has a plurality of, i.e., four in this embodiment, axial grooves 15 radially uniformly spaced apart around the bore 7 and a plurality of, i.e., four in this embodiment, spreadable portions 17 each formed between adjacent axial grooves 15 and having the upper end united to the lower surface of the flange 5 via a cylindrical uniting portion 17' and the lower end united to the others via hinge portions 16, the spreadable portions 17 being spread with the insertion of the pin-like portion 3 into the bore 7.

The spreadable portions 17 each have a tapering end terminating in the hinge portion 16. Its inner surface has an inclined surface 18 for gradually reducing the inner diameter of the bore 7, and its outer surface has an axial groove 19 having a substantially V-shaped sectional profile for facilitating its flexing.

The hinge portions 16 are each a thin bar-like portion having an upper end united to the tapering end of the associated spreadable portion 17 and a lower end united to a circular bottom portion 20 constituting the bottom of the bore 7. The individual hinge portions 16 are united together via the bottom portion 20.

The inner periphery of an upper portion of the bore 7, i.e., the inner periphery extending from the flange 5 to the uniting portion 17', is formed with a ridge 21 which can be fitted in or meshed with any one of the thread grooves 13 of the pin-like portion 3 of the male member 4. In this embodiment, the ridge 21 has a semi-circular sectional profile and is helical. Its upper and lower ends 21' and 21" are staggered with respect to a vertical line. The distance of offset between the upper and lower ends 21' and 21" is substantially the same as the width of the thread grooves 13 of the male member 4. In this embodiment, the ridge 21 is formed to once turn over substantially the entire circumference.

Figure 7:
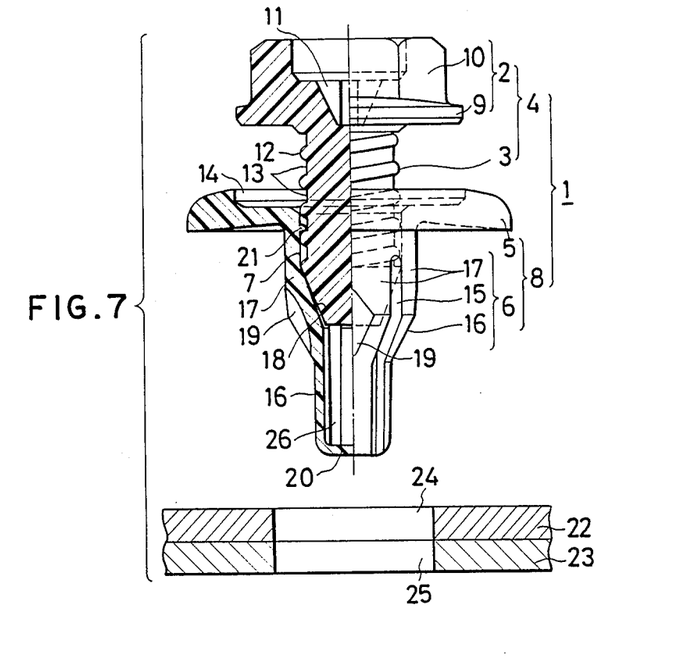
FIG. 7 is a side view, partly in section, showing the coupler with an end portion of the male member inserted in the member.

To couple or fasten together two overlapped plates 22 and 23 by using the male and female members 4 and 8 having the above structures, the two plates 22 and 23 are first formed with respective circular holes 24 and 25, as shown in FIGS. 1 and 7, which have an inner diameter substantially equal to or slightly greater than the outer diameter of the leg portion 6 of the female member 8 so that the leg portion 6 can penetrate them.

The male and female members 4 and 8 may be assembled together when coupling together the two plates 22 and 23. Here, to facilitate the handling, the two members are temporarily assembled in advance by shallowly inserting the pin-like portion 3 of the male member 4 into the bore 7 of the female member 8.

As the pin-like portion 3 of the male member 4 is inserted, its threads 12 strike the ridge 21 projecting into the bore 7. Since the threads 12 and ridge 21 have a semi-circular sectional profile, by strongly pushing the male member 4 the threads 12 clear the ridge 21 while wrenching the ridge 21 and slightly spreading the bore 7 as they advance along the bore 7. When the threads 12 have cleared the ridge 21, the bore 7 is restored to the initial diameter by the elastic restoring force of the spreadable portions 17 defining the bore 7. At this time, the ridge 21 is snappedly received in a thread groove 13 between adjacent threads 12, so that the pin-like portion 3 is held in a state shallowly inserted in the bore 7 (FIG. 7).

In this inserted state, the threads 12 of the pin-like portion 3 have not yet contacted the inclined surfaces 18 of the spreadable portions 17, so that the bore 17 is not spread but retains its initial inner diameter.

Then, the two plates 22 and 23 are overlapped one on top of the other with their holes 24 and 25 aligned, and the leg portion 6 of the female member 8 is inserted through the aligned holes 24 and 25. Eventually, the lower surface of the flange 5 of the female member 8 strikes the upper surface of the upper plate 22, and in this state the head 2 of the male member 4 is strongly pushed into the female member 8.

As a result, the threads 12 advance into the bore 7 by clearing the ridge 21 so that they reach the inclined surfaces 18. Since the inner diameter of the bore 7 at the inclined surfaces 18 is smaller than the outer diameter of the pin-like portion 3, as the pin-like portion 3 is forcibly inserted into the small diameter space 26, the inclined surfaces 18 are pushed in radially outward directions by the threads 12.

Figure 8:
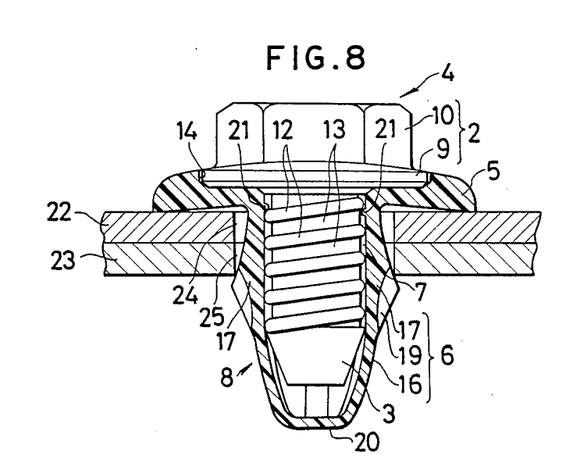
FIG. 8 is a sectional view showing the coupler of FIG. 1 coupling together two plates.
Figure 9:
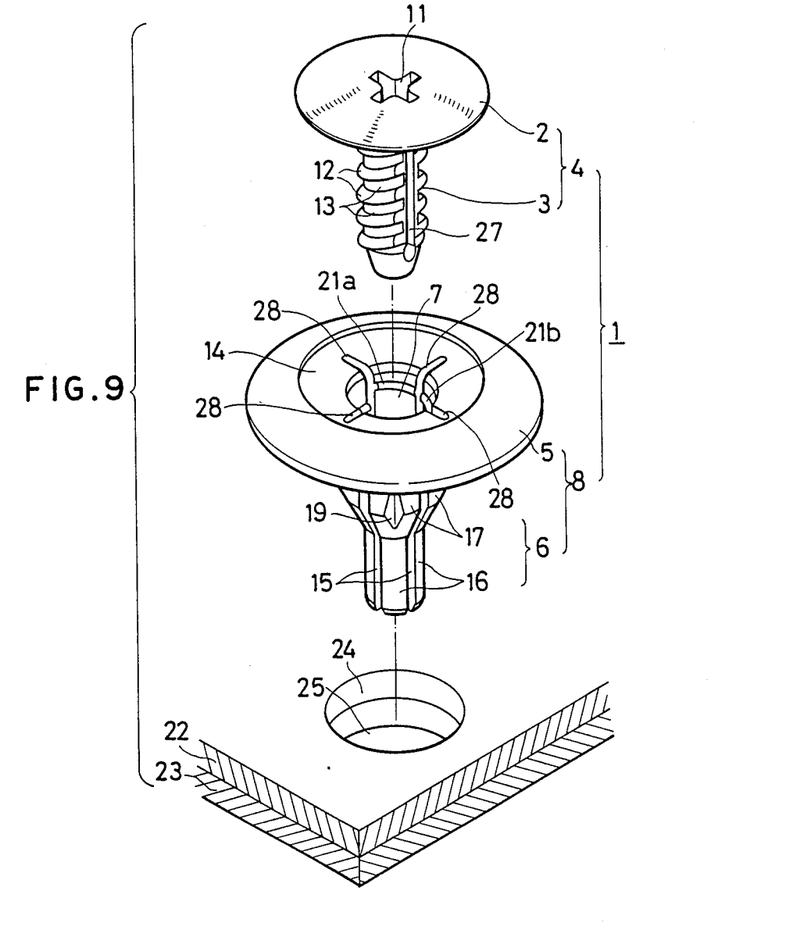
FIG. 9 is a perspective view showing male and female members, separated from each other, of a second embodiment of the coupler according to the invention.
Figure 10:
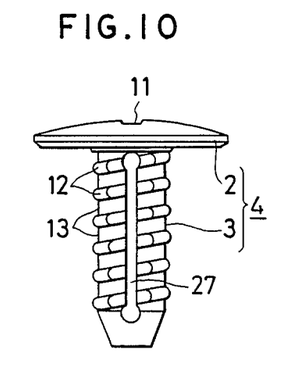
FIG. 10 is a front view showing the male member shown in FIG. 9.
Figure 11:
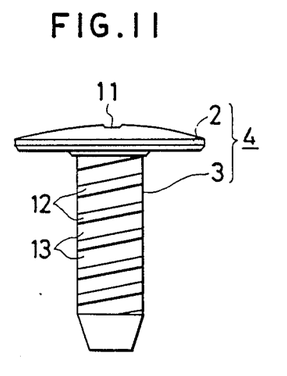
FIG. 11 is a side view showing the male member shown in FIG. 9
Figure 12:
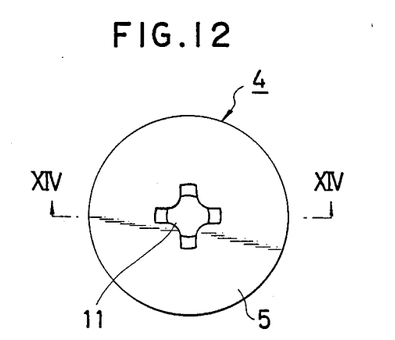
FIG. 12 is a plan view showing the male member shown in FIG. 9.
Figure 13:
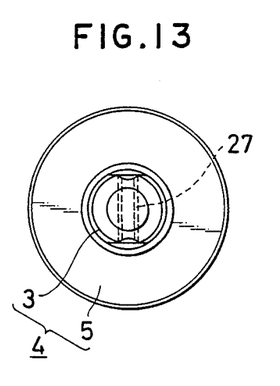
FIG. 13 is a bottom view showing the male member shown in FIG. 9.
Figure 14:
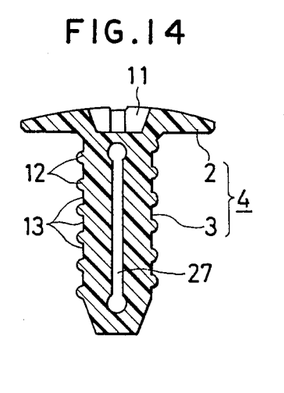
FIG. 14 is a sectional view taken along line XIV—XIV in FIG. 12.
Figure 15:
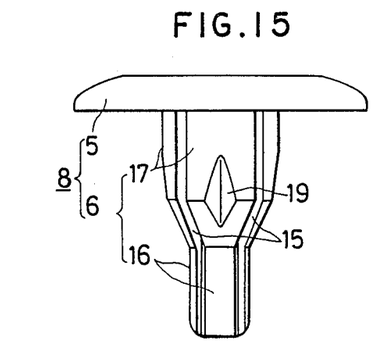
FIG. 15 is a side view showing the female member shown in FIG. 9.
Figure 16:
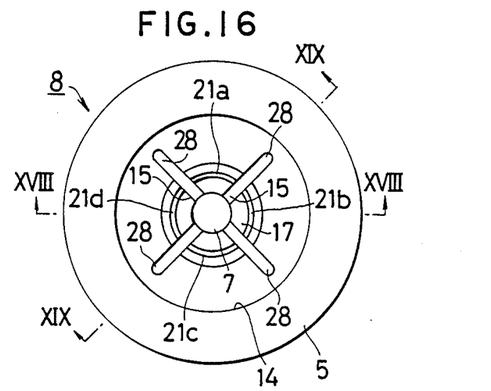
FIG. 16 is a plan view showing the female member shown in FIG. 9
Figure 17:
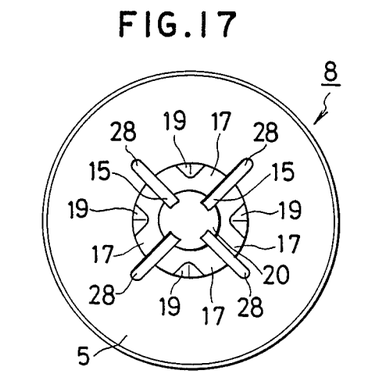
FIG. 17 is a bottom view showing the female member shown in FIG. 9.
Figure 18:
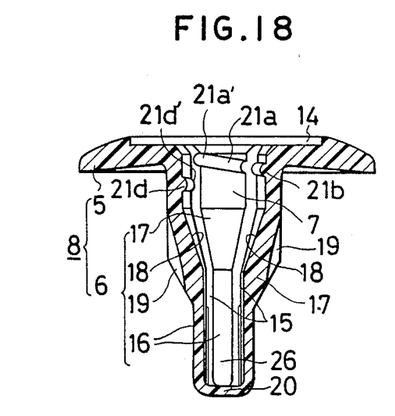
FIG. 18 is a sectional view taken along line XVIII—XVIII in FIG. 16.

In consequence, the spreadable portions 17 are spread radially outwardly under the lower plate 23. The two plates 22 and 23 are thus clamped between the lower surface of the flange 5 and the spreadable portions 17, and hence coupled together in the overlapped state (FIG. 8).

The male member 4 can be inserted until the lower surface of the seat portion 9 is brought into contact with the bottom of the annular recess 14 of the female member 8, and in this state the seat portion 9 is snugly and entirely received in the annular recess 14.

When it becomes necessary to separate the two plates 22 and 23 for the purpose of maintenance or the like, the head 2 of the male member 4 is turned in the direction opposite to the direction of the threads.

At this time, the head 2 of the male member 4 may be turned with a spanner or a wrench fitted on the bolt portion 10 or with a screwdriver fitted in the groove 11.

As the head 2 of the male member 4 is turned in the direction opposite to the direction of the threads, the ridge 21 received in a thread groove 13 is moved along the thread groove 13, so that the pin-like portion 3 is gradually retreated along the bore 7. Consequently, the spreadable portions 17 are restored to their initial diameter under the lower plate 23 by the elastic restoring force of the spreadable portions 17.

The leg portion 6 of the female member 8 thus restores to an outer diameter enabling its withdrawal from the holes 24 and 25. The two plates 22 and 23 are thus released from the coupled state so that they can be separated.

The female member 8 can be recovered by upwardly withdrawing it from the holes 24 and 25.

When the spreadable portions 17 which are united together by the hinge portions 16 restore to the initial state, they are uniformly pulled radially inwardly by the hinge portions 16. Thus, there is no possibility of plastic deformation of the spreadable portions 17, which would result in failure of restoration of the initial state, and the recovered female member can be re-used.

FIGS. 9 to 22 show a second embodiment of the coupler 1 according to the invention. In the Figures, parts corresponding to those described in connection with the preceding first embodiment are designated by like reference numerals, and the description of these parts is omitted.

As shown in FIGS. 9 to 14, in the male member 4 of the second embodiment the head 2 is comparatively thin, and the center of its top surface is formed with a groove 11 for receiving the tip of a screwdriver (not shown). The pin-like portion portion 3 has a diametrically penetrating axial slot 27 extending in its intermediate portion.

As shown in FIGS. 9 and 15 to 19, in the female member 8 the flange 5 is formed with four notches 28 radially uniformly spaced apart about the bore 7, open at the top and each communicating with one of the four axial grooves 15 formed in the leg portion 6. The annular recess 14 of the flange 5 has a size such that the head 2 of the male member 4 is snugly and entirely received, and the top surfaces of the flange 5 and head 2 are flush with each other when the pin-like portion 3 of the male member 4 is perfectly inserted in the bore 7.

Figure 19:
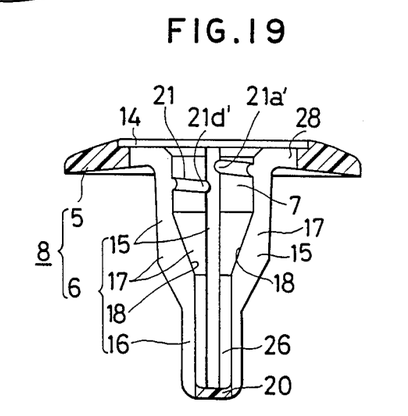
FIG. 19 is a sectional view taken along line XIX—XIX in FIG. 16.
Figure 20:
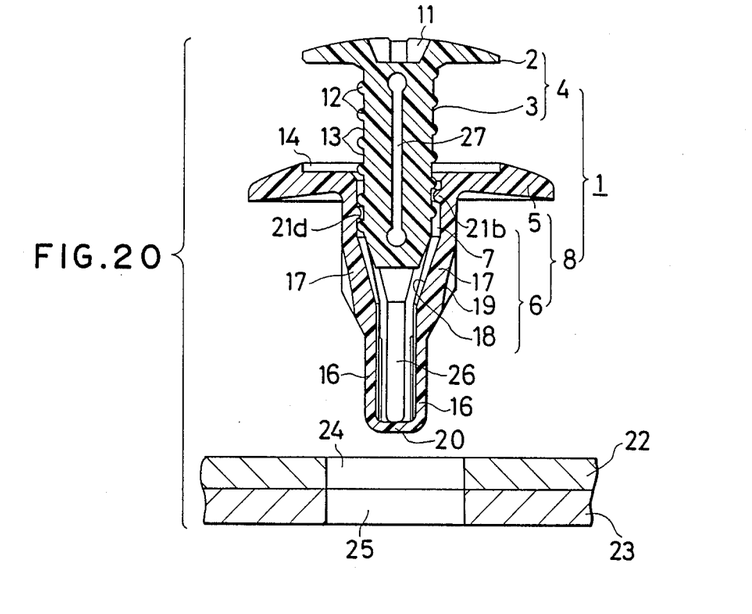
FIG. 20 is a sectional view showing the coupler with an end portion of the male member inserted in the female member.
Figure 21:
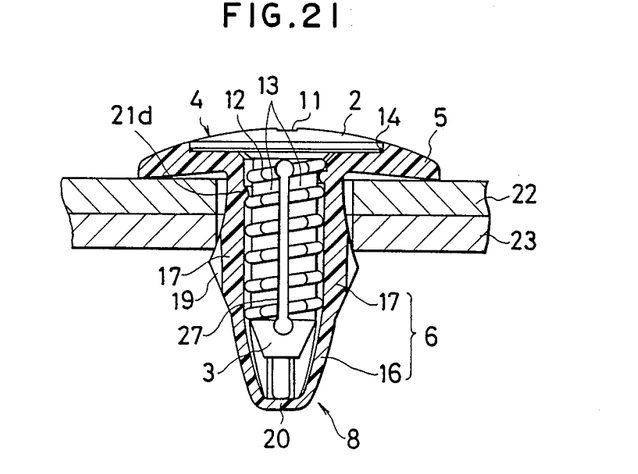
FIG. 21 is a sectional view showing the coupler shown in FIG. 9 coupling together two plates.

The ridge 21 is formed on the inner periphery extending from the flange 5 to the spreadable portions 17, and its length is divided by the notches 28 and axial grooves 15 into four divisions 21a to 21d which define a spiral as a whole. The upper end 21a' *of the uppermost ridge division 21a* and the lower end 21d' of the lowermost ridge division 21d are staggered and located at positions on the opposite sides of an axial groove 15 as shown in FIG. 19.

Alternatively, the upper and lower ends 21' and 21'' of the ridge 21 may be staggered at positions on the inner surface of a spreadable portion 17, as shown in FIG. 23.

In the second embodiment, since the pin-like portion 3 of the male member 4 has the axial slot 27, when the ridge 21 is pushed by the threads 12 so that the threads 12 clear the ridge 21, the pin-like portion 3 is slightly contracted. Also, since the female member 8 has the notches 28, when the ridge 21 is pushed by the threads 12, the open end of the bore 7 is spread. With the combination of the two effects, the threads 12 and ridge 21 clear one another while they are displaced away from one another. Thus, it is possible to reduce the force with which the male member 4 is inserted, and it is possible to avoid breaking the threads 12 and ridge 21.

It is possible to use either the male member 4 or the female member 8 in the first embodiment in combination with the counterpart mating member in the second embodiment.

Further, in the second embodiment it is possible to increase the extent of projection of the ridge 21 because the flange 5 of the female member is provided with the notches 28.

The molding of the female member 8 will now be explained with reference to FIG. 22. In the Figure, reference numeral 29 designates a stationary mold, 30 a product kicker pin, 31 a core pin for forming the bore 7 of the female member 8, and 32 a groove formed in the outer periphery of the core pin 31 for forming the ridge 21 of the female member 8.

When molding the female member 8, the stationary mold 29 and a movable mold (not shown) are butt-closed together, and then a molten plastic material is poured into the mold assembly. After the poured material has solidified, the mold assembly is opened by moving the movable mold, and then the product is kicked out of the stationary mold 29 by the kicker pin 30. At this time, the ridge 21 is formed by the groove 32 of the core pin 31.

To increase the extent of projection of the ridge 21, therefore, it is necessary to increase the depth of the groove 32 of the core pin 31. When the depth of the groove 32 of the core pin 31 is increased further than is necessary, however, it is liable that it is difficult or impossible to take out the core pin 31 from the product or a distortion is produced in the product.

In the second embodiment, since the flange 5 is provided with the notches 28, when the core pin 31 is taken out the bore 7 is spread from the notches 28 and axial grooves 15, so that the core pin 31 can be taken out more easily than the case where there are no notches 28. It is thus possible to correspondingly increase the depth of the groove 32 of the core pin 31 to increase the extent of projection of the ridge 21.

It is thus possible to increase the extent of mesh between the ridge 21 and the pin-like portion 3 of the male member 4. Particularly, the male member 4 can be turned quickly without any possibility of idling when using a motor-driven screwdriver. It is thus possible to provide a coupler suitable for the operation of separating the two members by using a motor-driven screwdriver.

As has been described in the foregoing, according to the invention it is possible to provide a coupler for coupling together two plates, in which the ridge and thread grooves of the pin-like portion have complementary shapes, so that accurate mesh can be obtained and the male member can be turned without any possibility of idling in the direction opposite to the direction of the threads.

What is claimed is:

1. A plastic fastener, comprising a male member having a head and a pin-like portion having male threads, said pin-like portion depending from the lower surface of said head, and a female member having a flange facing said head of said male member, a leg portion depending from the lower end of said flange and a bore extending from the upper surface of said flange into said leg portion and capable of receiving said pin-like portion of said male member, said pin-like portion having a diametrically penetrating axial slot which extends in its intermediate portion, said leg portion of said female member having a plurality of axial grooves radially spaced apart around said bore and a plurality of spreadable portions each defined between adjacent ones of said axial grooves and having an upper end connected to the lower surface of said flange and a lower end connected to the lower ends of the other spreadable portions by hinge portions, said spreadable portions being adapted to be spread with the insertion of said pin-like portion into said bore, an upper portion of the inner periphery of said bore being formed with a helical ridge which makes a complete revolution along the inner periphery of said bore and is received in a thread groove defined between the male threads of said pin-like portion.

2. A plastic fastener, comprising a male member having a head and a pin-like portion having male threads, said pin-like portion depending from the lower surface of said head, and a female member having a flange facing said head of said male member, a leg portion depending from the lower end of said flange and a bore extending from the upper surface of said flange into said leg portion and capable of receiving said pin-like portion of said male portion, said pin-like portion having a diametrically penetrating axial slot which extends in its intermediate portion, said leg portion of said female member having a plurality of axial grooves radially spaced apart around said bore and a plurality of spreadable portions each defined between adjacent ones of said axial grooves and having an upper end connected to the lower surface of said flange and a lower end connected to the lower ends of the other spreadable portions by hinge portions, said spreadable portions being adapted to be spread with the insertion of said pin-like portion into said bore, an upper portion of the inner periphery of said bore being formed with a helical ridge which makes a complete revolution along the inner periphery of said bore and is received in a thread groove defined between the male threads of said pin-like portion, whereby, when said pin-like portion is inserted into said bore, an outer diameter of said pin-like portion slightly contracts, thereby minimizing deformation of the helical ridge by the threads of said pin-like portion and reducing the force necessary to insert said pin-like portion into said bore.

3. The coupler according to claim 1, wherein said flange of said female member is provided with a plurality of notches radially spaced apart around said bore, open at the top surface and communicating with said axial grooves of said leg portion.

4. The coupler according to claim 1, wherein said spreadable portions are each provided with a groove having a substantially v-shaped sectional profile.

* * * * *

UNITED STATES PATENT AND TRADEMARK OFFICE
CERTIFICATE OF CORRECTION

PATENT NO. : 4,878,791

DATED : Nov. 7, 1989

INVENTOR(S) : Kazumasa Kurihara, et al

It is certified that error appears in the above-identified patent and that said Letters Patent is hereby corrected as shown below:

On the title page:

The total number of Drawing Sheets is incorrect, should be: --8--

Signed and Sealed this

Twelfth Day of February, 1991

*Attest:*

HARRY F. MANBECK, JR.

*Attesting Officer*     *Commissioner of Patents and Trademarks*